Patented Jan. 13, 1931

1,788,799

UNITED STATES PATENT OFFICE

MARTIN LUTHER, OF MANNHEIM, AND ERNST WILLFROTH, OF NEUROESSEN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF OXIDATION PRODUCTS FROM CRUDE PARAFFIN HYDROCARBONS, WAXES, AND THE LIKE

No Drawing. Application filed April 8, 1929, Serial No. 353,678, and in Germany April 25, 1928.

The present invention relates to the production of oxidation products from crude paraffin hydrocarbons waxes and the like.

In the treatment of solid or liquid paraffin wax with oxygen or gases containing oxygen such as air, it is difficult to obtain oxidation products when initial material is employed in a crude or in a partially purified condition, as for example in the form of crude paraffin scale, because the impurities contained in the crude paraffin wax very considerably retard the action of the oxidizing agent.

We have now found that crude paraffin wax, which term is meant to include partially purified paraffin wax, and the like are directly and quickly converted into valuable oxidation products by passing gases containing oxygen, such as air, mixed with nitric oxides, through the liquefied crude paraffin wax. The operation may be performed in various ways, as for example, in vessels provided with inert or active fillers of large superficial area which process can be performed also in a cycle. The oxidizing action may be accelerated by the employment of suitable catalysts, such as calcium or aluminium oxide or compounds of manganese. The temperature employed should be above the melting point of the paraffin wax, that is above about 45° to 55° C. and not higher than about 160° C.

The following examples will further illustrate the nature of the said invention which however is not limited thereto.

Example 1

Brown paraffin scales are heated to 150° C. in a tall still filled with Raschig rings. A current of air, with an admixture of 7 per cent by volume of nitric oxides, is then passed through at the rate of, for example, 1 cubic meter or more per hour for each kilogram of crude paraffin wax, care being taken that the temperature does not exceed 160° C. The product obtained after 6 hours' blowing, shows the acid value 60, saponification value 242, and still contains 15 per cent by weight of unsaponifiable constituents.

The gaseous mixture obtained in the oxidation of ammonia can be advantageously employed as the mixture containing nitric oxides, being used either by itself or mixed with oxygen.

Example 2

Crude scales of paraffin wax together with 0.1 per cent by weight of barium acetylacetonate

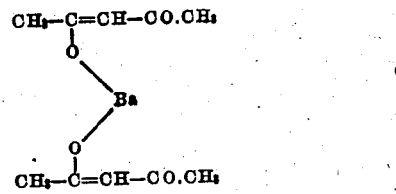

are treated at 150° C. with a current of air containing 6 per cent by volume of nitrogen oxides in the manner described in Example 1. After blowing for 6 hours the product obtained shows an acid value of 182 and contains 36 per cent by weight of unsaponifiable matter.

Example 3

Crude paraffin wax with a content of 95 per cent of paraffin is mixed with 0.2 per cent by weight of manganese acetylacetonate

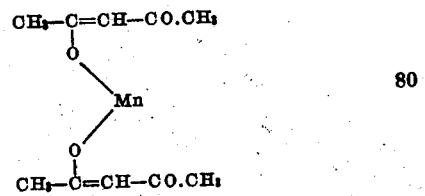

and treated at from 140° to 145° C. with a current of air containing 0.7 per cent by volume of nitrogen oxides in the manner described in Example 1. After blowing for 6 hours a product showing an acid value of 177 and a saponification value of 219 is obtained which contains 44 per cent by weight of unsaponifiable matter.

What we claim is:—

The process for the production or oxidation products from crude paraffin hydrocarbons and waxes, which comprises acting upon the said initial materials in the liquid state with gases containing oxygen and nitric oxides in the presence of filler bodies with a large superficial area and of a metal enolate.

In testimony whereof we have hereunto set our hands.

MARTIN LUTHER.
ERNST WILLFROTH.